(12) United States Patent
Jansen et al.

(10) Patent No.: US 8,104,258 B1
(45) Date of Patent: Jan. 31, 2012

(54) FUEL CONTROL SYSTEM WITH METERING PURGE VALVE FOR DUAL FUEL TURBINE

(75) Inventors: Harvey B. Jansen, Mesa, AZ (US); Schuyler V. McElrath, Easley, SC (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 879 days.

(21) Appl. No.: 12/126,673

(22) Filed: May 23, 2008

Related U.S. Application Data

(60) Provisional application No. 60/939,980, filed on May 24, 2007.

(51) Int. Cl.
*F02C 9/00* (2006.01)
*F02G 3/00* (2006.01)

(52) U.S. Cl. ............ 60/39.281; 60/734; 60/39.094; 431/3; 137/240; 137/625.48

(58) Field of Classification Search .......... 60/39.094, 60/734, 39.281; 431/3; 137/240, 242, 245, 137/246, 246.16, 246.17, 625.48
See application file for complete search history.

(56) References Cited

U.S. PATENT DOCUMENTS

| | | | |
|---|---|---|---|
| 3,138,175 A | 6/1964 | Chilcoat | |
| 3,882,883 A | 5/1975 | Droegemueller | |
| 4,231,399 A | 11/1980 | Pauliukonis | |
| 4,719,749 A | 1/1988 | Greune et al. | |
| 5,735,117 A * | 4/1998 | Toelle | 60/39.094 |
| 6,050,081 A | 4/2000 | Jansen et al. | |
| 6,438,963 B1 | 8/2002 | Traver et al. | |
| 6,931,831 B2 | 8/2005 | Jansen | |
| 2005/0097880 A1 | 5/2005 | Jansen | |

* cited by examiner

*Primary Examiner* — Ehud Gartenberg
*Assistant Examiner* — Craig Kim
(74) *Attorney, Agent, or Firm* — Steven J. Wietrzny; Quarles & Brady LLP

(57) ABSTRACT

The fuel system of a dual fuel turbine includes a flow control valve having a metering purge valve that in one state directly meters fuel to injectors of the turbine, in another state closes of fuel flow and passes purge air to the injectors and in another state positively closes of flow of both fuel and purge air. The metering purge valve is a pressure compensated spool valve that has a unique cross-ported interchange that passes fuel from the inlet through the spool to the metering edge. The direct metering of the valve to the injectors eliminates the need for additional shut off valves, and if used with a combining valve having an integral distributor section metering fuel to multiple injectors, the need for a separate flow divider is also eliminated. The valve can be actively cooled by dedicated coolant lines or lines shared with other flow control components such as additional metering valves for either the primary or secondary fuel.

20 Claims, 5 Drawing Sheets

FUEL CONTROL SYSTEM WITH METERING PURGE VALVE FOR DUAL FUEL TURBINE

CROSS-REFERENCE TO RELATED APPLICATION(S)

This application claims benefit to U.S. provisional application Ser. No. 60/939,980 filed May 24, 2007.

STATEMENT OF FEDERALLY SPONSORED RESEARCH OR DEVELOPMENT

Not applicable.

BACKGROUND OF THE INVENTION

1. Technical Field

The present invention relates to valves, and in particular, to valves for use with turbine engines.

2. Description of the Related Art

Turbine engines have a set of rotating turbine blades that compress air into the combustion area where fuel is injected and ignited. Combustion of the fuel turns a downstream set of blades from which energy is extracted and which can also be used to drive the compressor blades.

The combustion area of the turbine can be divided by and contained in combustion cans. There are anywhere from six to eighteen such cans in the large turbine systems used to generate power. Each can has a burner to ignite the fuel as well as injectors for injecting the fuel into the can for combustion. Typically, some of the injectors are designated as primary injectors and one or more are secondary injectors. The primary injectors are used during the start-up sequence and at periods of lower fuel consumption, but otherwise both the primary and secondary injectors are used during normal operation of the turbine.

Many turbine systems are designed for dual fuel operation, such that either a liquid fuel, such as diesel fuel, or a gaseous fuel, such as natural gas, is consumed when the turbine is operating. The liquid fuel, for example, could be delivered to the combustion cans via the primary and secondary injectors mentioned, and one or more additional gas injectors could be provided at each can for delivery the gaseous fuel during operation in gas mode.

When the engine is to be shut down or when the engine is operated in gas mode, the fuel pump supplying liquid fuel is turned off, a fuel line valve is closed and the fuel line and the injectors are purged with hot gases from the turbine compressors. Because the injectors are adjacent the burners and thus extremely hot, the relatively cool, yet still hot purging air cools the injectors and reduces "coking" at the injector orifices, which can occur when volatile components of the fuel are driven off by heat leaving only a tarry deposit. Purging is necessary to prevent the injectors from being damaged as well as to ensure that the orifices and valves are clear of coke deposits, which could inhibit proper delivery of the fuel when the turbine is returned to fuel mode.

In order to permit purging of the liquid fuel line, a purging air line must join with the fuel line. It is important that the fueling and purging operations be isolated so that fuel does not go down the purge air line and hot gases do not travel up the fuel line to the fuel supply. Check valves are often installed in each of these lines to prevent this. However, common spring-loaded checks may be unreliable, sticking in the open position or allowing some backwash into either of the fuel or purge lines. Alternatively, the fuel cut-off valve may be operated by a pneumatic actuator in line with the check valve of the fuel line, however, this is also subject to coking and may introduce substantial pressure drops in the fuel flow. The fuel cut-off valve also introduces a potential failure point to the turbine where, if pressure is lost to the pneumatic actuator, the turbine will cease operating.

A three-way purge valve is disclosed in U.S. Pat. No. 6,050,081, assigned to the assignee of the present invention and hereby incorporated by reference as though fully set forth herein, which provides a significantly more reliable mechanism for air purging and fuel control, both preventing backwash and being more resistant to coking. As disclosed, a spool valve having an enlarged middle section was used to shuttle between positions alternatively blocking the combustion can from either the purge air line or the fuel line. The spool is biased to close off the fuel line and is urged to open the fuel line by a pilot air actuated piston. Thus, when fuel is to be closed off from the engine, the spool valve will return to its initial position thereby allowing the burner nozzles and the downstream side of the spool to be purged to reduce or eliminate coking in these areas.

To avoid the need to use dedicated purge valves for each injector, a separate distributor can be mounted to each combustion can to act as a manifold to which the several fuel lines connect before the fuel is routed to the individual injectors. This additional component and additional lines add significant cost, assembly and size to the system. And, these parts create additional areas for coking to occur, particularly given that the distributor is typically mounted directly to the combustion can which realizes extreme temperatures during combustion.

A distributor three-way purge valve is disclosed U.S. Pat. No. 6,931,831, assigned to the assignee of the present invention and hereby incorporated by reference as though fully set forth herein, which overcomes the aforementioned problem by combining the functionality of the three-way purge valve with that of a distributor in a single unit.

While these valves provided a significant improvement to turbine fuel systems, it was still necessary to separately control metering to the injectors since these valves had no metering capabilities and the fuel was delivered into the combustion cans through open metering orifices. Thus, separate flow dividers and shear valves were required. Further, the valves themselves became additional components which add to the complexity and thus decrease the reliability of the system.

SUMMARY OF THE INVENTION

The present invention addresses the shortcomings of the prior art by incorporating a unique metering purge valve in the fuel control system of a turbine system, and especially a dual fuel turbine. In a single valve package, the metering purge valve provides metering control of fuel, fuel shut-off and anti-coking purge air functionality directly to the turbine without the need for intermediate lines, additional valving or separate fuel metering components. Furthermore, actively cooling the metering purge valve reduces its susceptibility to coking.

In particular, in one aspect the invention provides a metering purge valve for use in a turbine fuel system. The metering purge valve has a valve body defining a valve passageway in communication with a purge air inlet, a fuel inlet and a fuel outlet. A spool, movable along a spool axis within the valve passageway, has a metering surface for metering flow from the fuel inlet to the fuel outlet and an interchange providing communication through the spool from the fuel inlet to the metering edge.

The spool can be moved to a first position in which the purge air inlet and the fuel inlet are essentially closed off from the fuel outlet. In this null position, the metering purge valve acts as a fuel shut off as well as a stop valve for the purge air. When fuel is to be delivered to the injectors of the turbine, the spool can be moved to a second position in which the fuel inlet is open to the fuel outlet and the purge air inlet is essentially closed off from the fuel outlet. Then when no fuel is provided to the injectors, the metering purge valve can be moved to a third position in which the fuel inlet is essentially closed off from the fuel outlet and the purge air inlet is open to the fuel outlet.

In one form, the spool has a contoured region of decreased radial dimension adjacent to the metering edge. The interchange includes porting internal to the spool valve that opens to this region proximate the metering edge, thereby permitting fuel to flow from the inlet to the outlet when the valve is in the proper position. The spool is sealed with respect to the valve body by at least two seals, one seal located between the fuel inlet and the fuel outlet and another located between the purge air inlet and the fuel outlet.

The valve body can also include an interstitial vent to ensure that fuel and/or purge air is not inadvertently passed to the fuel outlet at the wrong time. In on form, the interstitial vent is located in communication with the valve passageway between the fuel inlet and the fuel outlet. When the valve has an interstitial vent, there are at least three seals sealing between the spool and the valve body, including two seals on each side of the interstitial vent between the vent and each of the fuel inlet and the fuel outlet. The third seal is located between the fuel outlet and the purge air inlet, as mentioned above.

The metering purge valve can also be adapted for active cooling to allow for direct mounting the combustion can of the turbine without coking being a significant problem. Various configurations of the metering purge valve can be employed to pass coolant, such water or like fluids, through or adjacent to the components of the valve. The valve body can have an external jacket with coolant passages or the valve body can have internal porting and routing passages for coolant. Internal grooves or sleeves can be included to route the coolant near to the spool.

The metering purge valve can also be made to have an essentially constant pressure at the metering head through the use of a pressure compensating arrangement or module, which can be disposed within a cavity of the valve body between the fuel inlet and the valve passageway. The pressure compensating arrangement uses a movable inverted spool having an annular metering edge movable to control flow through a stationary spool member having porting that leads to the valve passageway.

Another aspect of the invention provides a dual fuel turbine system with one or more combustion cans, each combustion can having one or more injectors, and a flow control system having a valve as mentioned above for alternatively metering fuel to the injectors and passing hot purge air to the injectors.

Yet another aspect of the invention provides a flow control system for a fuel system of a dual fuel turbine engine. The fuel system has a first fuel supply and components for conveying the first fuel to the turbine and a second fuel supply and components for conveying the second fuel to the turbine. The turbine has a first injector for receiving the first fuel and a second injector for receiving the second fuel. The first and second injectors are in communication with a combustion area of the turbine. The flow control system includes a metering valve coupled to the second fuel supply for metering the second fuel directly to the second injector, and a metering purge valve, as described above, coupled to a purge air line and to the first fuel supply for alternatively metering the first fuel directly to the first injector and purging the first injector. The metering valve meters the second fuel to the second injector only when and the metering purge valve is not purging or metering the first fuel to the first injector.

The fuel system can have multiple combustion cans, such as 6-18 in number, each including multiple primary injectors and one or more secondary injectors for the first fuel, and one or more second fuel injectors. In this case, there are multiple metering purge valves each coupled to the first fuel supply and multiple metering valves each coupled to the second fuel supply. Further, the flow control system can include a combining metering purge valve having an inlet coupled to the first fuel supply and a valve member metering flow to a distributor section with multiple outlets. In this way, the combining meter valve can distribute and meter either the first fuel or purge air to the multiple primary injectors of each combustion can, multiple purge metering valves meter the first fuel or purge air to the secondary injector(s) of each combustion can, and the metering valve can meter the second fuel to the associated injector(s) of each can. The two fuels are consumed consecutively, rather than simultaneously, and the injectors are only purged when no fuel is present.

Furthermore, the metering valves can be configured for active cooling using a dedicated coolant line or system for each, or by using a shared coolant system in which the metering valves are linked together by intermediate coolant lines.

These and still other advantages of the invention will be apparent from the detailed description and drawings. What follows is a preferred embodiment of the present invention. To assess the full scope of the invention the claims should be looked to as the preferred embodiment is not intended as the only embodiment within the scope of the invention.

DETAILED DESCRIPTION OF THE PREFERRED EMBODIMENT(S)

The present invention provides a unique metering purge valve and a fuel control system of a turbine system which utilizes such a metering purge valve. In a single valve package, the metering purge valve provides metering control of fuel, fuel shut-off and anti-coking purge air functionality directly to turbine without the need for intermediate lines, additional valving or separate fuel metering components. The advantages of the metering purge valve and fuel control system are particularly beneficial for dual fuel turbine systems.

Figure 1:
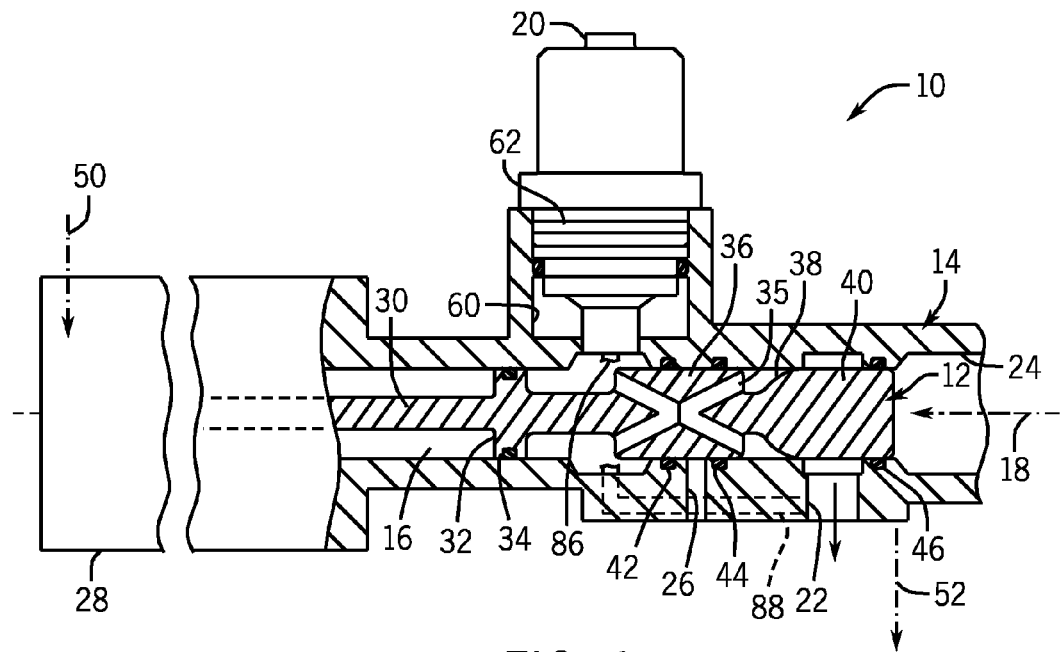
FIG. 1 is a partial sectional view through a metering purge valve of the present invention for metering fuel to the injectors of a turbine engine and purging the injectors with purge air when the fuel supply is shut off, the valve is shown with a spool in a null position in which both fuel and purge air are closed off from the valve outlet, and thus the turbine injectors.
Figure 2:
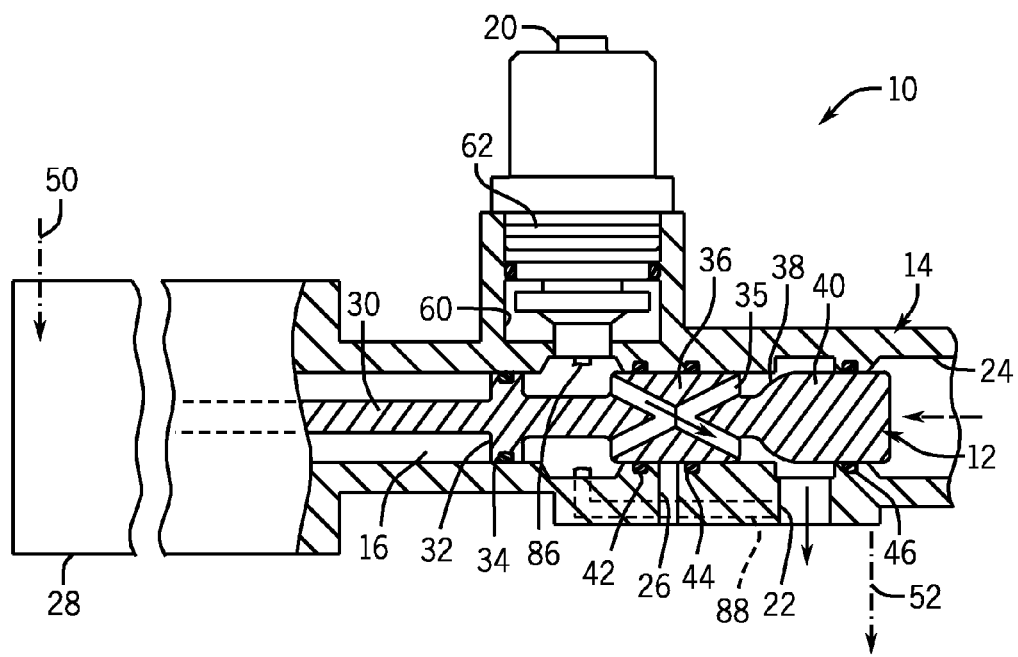
FIG. 2 is a sectional view similar to FIG. 1 albeit with the spool shown in position to allow metering of fuel to the turbine injectors.
Figure 3:
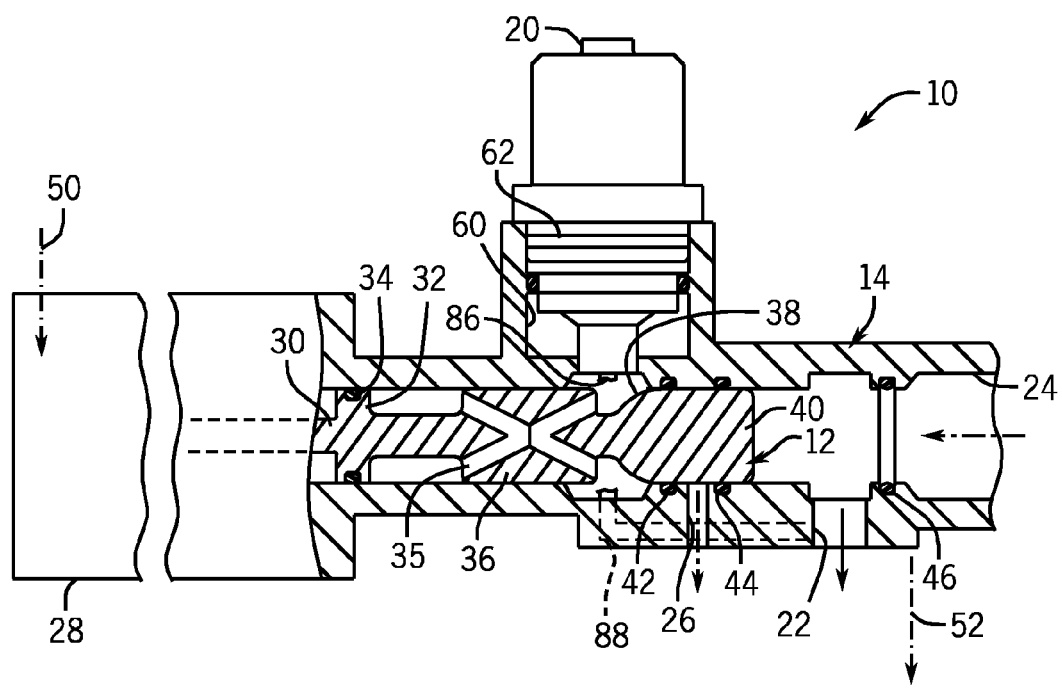
FIG. 3 is another similar sectional view albeit with the spool shown in position to purge the injectors.

FIGS. 1-3 of the drawings depict the general construction of a metering purge valve 10 according to the present invention in three different states or positions of its spool 12. In the null position shown in FIG. 1, the spool 12 closes off both fuel flow and purge air flow. The valve 10 thus provides tight shut-off of flow, thereby eliminating the need for additional dedicated shut-off or shear valves. In the position shown in FIG. 2, the spool 12 maintains the purge air flow shut off while allowing fuel to flow through the valve. The position of the spool 12 in this state can be varied to adjust the volume and rate of fuel metered from the valve. Fuel flow is then shut off when the spool 12 is in the FIG. 3 position, and purge air is permitted to flow through the valve. Note that in all case, the spool 12 is configured to isolate the fuel stream from the purge air stream.

The construction of the metering purge valve 10 will now be described in more detail. Specifically, the valve 10 includes a valve body 14 defining a valve passage 16 disposed along a spool axis 18. The spool 12 shuttles between the FIGS. 1 and 3 positions along the spool axis 18 within the valve passage 16 and thus moves with respect to a fuel inlet 20, a fuel outlet 22 and a purge air inlet 24 of the valve body 14. It should be noted that the fuel outlet 22 is actually an outlet for both fuel from the fuel inlet 20 and hot purge air from the purge air inlet 24, however, only one media is permitted to flow into the outlet 22 at a time. The valve body 14 also has an interstitial vent 26. Although not shown, the fuel inlet 20, fuel outlet 22, purge air inlet 24 and interstitial vent 26 can be coupled to associated fuel, air or vent lines by suitable fittings or connections.

The valve has an on-board drive or actuator 28 which interacts with an elongated shaft 30 of the spool 12 to precisely control movement of the spool 12 along the spool axis 18. The actuator can be any suitable hydraulic or electromechanical drive unit, such as an electro-magnetic servo motor arrangement, that is sufficiently accurate and capable of operating in a high pressure environment.

The spool 12 has an enlarged diameter annular section 32 with a circumferential groove holding a shaft seal 34 providing a sliding seal closing off the fuel inlet 20 from actuator 28. An enlarged diameter center section 36 of the spool 12 has internal porting 35, for example in a crisscross pattern that intersect as the center of the spool section 36, however, single run porting, or multiple run porting that does not intersect, that runs in an axial or generally axial direction could also be used. On the upstream and downstream sides of spool section 36, the spool 12 has a decreased diameter such that the porting can opening to by axial ends of spool section 36 in communication with the valve passage 16. To the downstream side of spool section 36 (opposite section 32) is a contoured metering edge 38 leading to an enlarged diameter end section 40.

The spool sections 36 and 40 are sized to close tolerances with the primary inner diameter of the valve passage 16 so as to reduce leakage and engage one or more of three seals 42-46, while permitting sliding of the spool 12. Specifically, the seals 42-46 are arranged in the valve passage 16 about the spool axis 18 so that axially the seal 42 is between a widened annulus 48 of the valve passage 16 in communication with fuel inlet 20 and the interstitial vent 26, the seal 44 is between the interstitial vent 26 and the fuel outlet 22, and the seal 46 is between the fuel outlet 22 and the purge air inlet 24.

Spool section 36 seals against both of the seals 42 and 44 in the FIGS. 1 and 2 positions such that there is a primary and redundant seal between the fuel inlet 20 and the fuel outlet 22, and a third seal between the fuel inlet 20 and the purge air inlet 24, by virtue of the seal 36 mating with spool section 40. Flow of fuel from the fuel inlet 20 to the fuel outlet 22 would thus otherwise be closed off because the seals 42 and 44, except for the porting 35 through section 36 of the spool 12. However, this porting 35 acts as an interchange between the upstream and downstream sides of spool section 36 and allows communication through the spool 12 from the fuel inlet 20 (through the annulus 48) directly to the contoured metering edge 38 of the spool 12. In the FIG. 3 position, spool section 40 unseats from the seal 46 to open the purge air inlet 24 to the fuel outlet 22, and seats on the seals 42 and 44, with the metering edge 38 upstream of seal 42, which again provides redundant sealing between the fuel and air sections of the valve 10.

The interstitial vent 26 provides further protection against the inadvertent mixing of fuel and hot air (and any secondary fuel that may be used in a dual fuel turbine system, as described below). Specifically, when the spool 12 is in the FIG. 1 position, any media, again such as a secondary fuel, entering through the fuel outlet 22 due to back pressure on the valve 10, and leaking past the seal 44 will be routed away from the fuel side of the valve 10 through the interstitial vent 26. Any media that would leak past the seal 46 would enter the purge air stream, which is less problematic albeit undesired. Similarly, when the valve 10 is in purge mode, and thus spool 12 is in the FIG. 3 position, any purge air leaking past seal 44 would be routed through the interstitial vent 26 and away from the fuel side of the valve 10. The interstitial vent 26 also plays a role in evacuating residual fuel in the valve passage 16, and particularly the annulus 48, when the valve 10 is converted from fuel mode to purge mode. As the spool 12 is moved from the FIG. 2 position to the FIG. 3 position, it takes an intermediate position in which the interstitial vent 26 is in direct communication with the fuel side of the valve. Since there will likely still be some pressurization at the fuel side at this point, the remaining fuel is forced out through the interstitial vent 26 and thus cleared from the valve 10.

Two additional aspects of the metering purge valve 10 of the present invention should be noted, these include pressure compensation and active cooling aspects of the valve 10. In particular, the valve 10 can be actively cooled to reduce the temperature environment within the valve 10. This in turn allows the valve 10 to be located in close proximity to the combustion area of the turbine, such as mounted directly on a combustion can, while reducing the occurrence of coking in such an elevated temperature environment. The drawings depict via arrows coolant inlet 50 and outlet 52 lines for bringing coolant into the valve 10 at one end and carrying away the heated coolant at the other. While not shown in detail, any suitable configuration can be used to route the coolant through the valve 10, including internal porting and passageways in the valve body 14 or an external coolant jacket mounted to the valve body 14. Components internal to the valve body 14 could also be used added to route coolant through the valve 14. Spiral flow about the spool axis 18 as well as serpentine and other flow path configurations could be used. Exemplary configurations for routing coolant through metering and other valves is provided by the assignee of the present invention in U.S. patent application publication US 2005/0097880, published on May 12, 2005 and entitled "Water Cooled Liquid Fuel Valve." The entire disclosure of this application, and in particular the portions of the specification pertaining to FIGS. 8-10 thereof, is hereby incorporated by reference as through fully set forth herein. Water cooling the valve 10 is also important to keep the sensitive drive electronics cool, and it is this aspect that allows the valve 10 to be a "smart" valve with onboard control in this extreme temperature environment.

As mentioned, the metering purge valve 10 is also pressure compensated. Specifically, with reference to FIGS. 4 and 5, the valve body 14 has a chamber 60 at the fuel inlet 20 for a pressure compensating module 62 designed to establish a constant pressure drop between the fuel inlet 20 and the fuel outlet 22, or in other words across the metering edge 38 of the spool 12, which improves the metering accuracy and consistency of the valve 10.

The pressure compensating module 62 includes an annular poppet 64 that rides in close contact on an elongated cylindrical guide 66 having a lower opening 68, transverse orifices 70 and a central upper opening 72. The poppet 64 is spring-loaded by a spring 74 sandwiched between upper 76 and lower 78 spring retainers, the upper spring retainer 76 having inlet ports 80 in communication with the fuel inlet 20. The spring 74 biases the poppet 64 to an open position in which an annular flange 82 seats up against a seal 84 held within a face groove of the lower spring retainer 78. A tubular member 86 extends from the upper opening 72 of the guide 66 through the valve body 14 (so as not to intersect the valve passage 16) to an internal passage 88 communicating with the fuel outlet 22. The tubular member 86 and internal passage 88 provide a pressure feedback path from the outlet to the inlet side of the valve 10.

Figure 4:
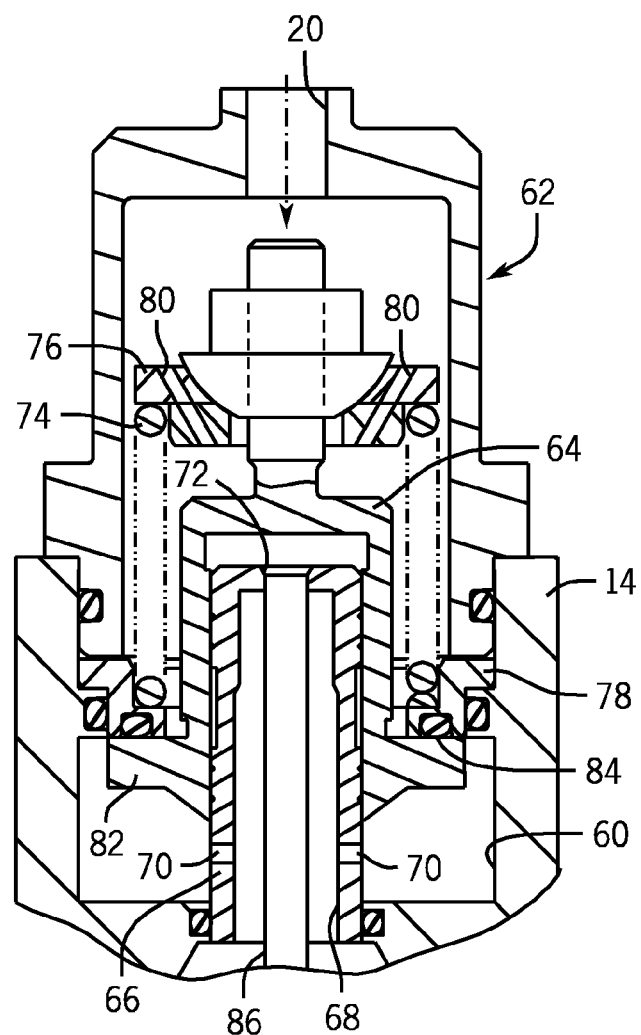
FIG. 4 is a partial enlarged sectional view of a pressure compensating arrangement of the metering purge valve shown in a position corresponding to the spool positions shown in FIGS. 1 and 3.
Figure 5:
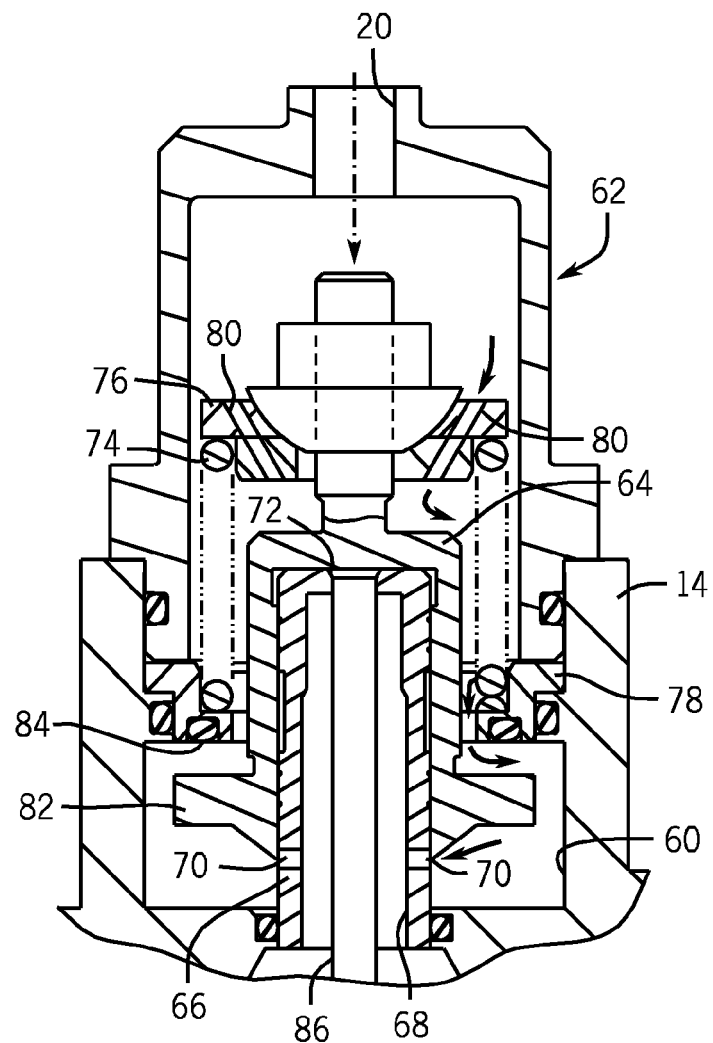
FIG. 5 is a partial enlarged sectional view similar to FIG. 4 albeit in a position corresponding to the spool position shown in FIG. 2.

When the valve 10 is in either the FIG. 1 or 3 position, in which the fuel side of the valve is generally not pressurized, the spring force returns the poppet flange 82 to seat against the seal 84, as shown in FIG. 4. This provides a further seal keeping media from being introduced to the fuel, via back pressure or the like, since it is trapped within the space between the poppet 64 and the guide 66. When the valve 10 is metering fuel, with the spool 12 in the FIG. 2 position, the fuel pressure counteracts the spring force and unseats the poppet flange 82 to allow fuel to flow from the fuel inlet 20, through the ports 80, around the poppet flange 82 to the outside of the guide 66, through the transverse orifices 70 and down through the lower opening 68 in the guide 66 to the valve passage 16. As shown in FIG. 5, the angled edge of the poppet 64 controls the rate of flow through the transverse orifices 70 according to the pressure within the valve 10.

Figure 6:
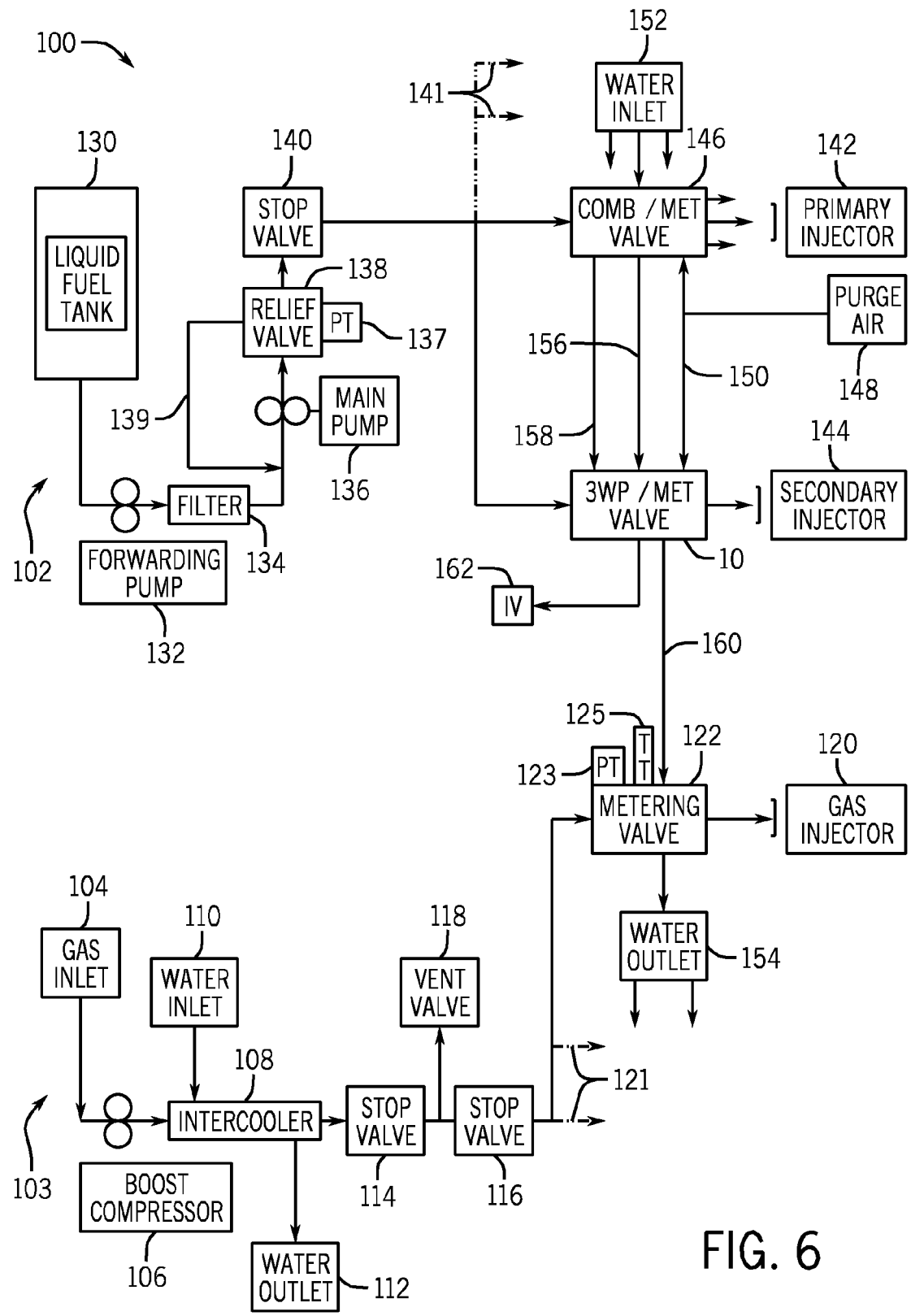
FIG. 6 is a schematic block diagram illustrating a fuel control system for a dual fuel turbine system according to the present invention incorporating a metering purge valve as shown in FIG. 1.

As mentioned, the metering purge valve 10 is designed to be part of the fuel control system of a turbine engine. FIG. 6 illustrates schematically and in simplified form an exemplary duel fuel turbine system 100, which includes a liquid fuel side 102, such as for diesel fuel, and a gaseous fuel side 103, such as for natural gas. First, the gaseous fuel side 103 includes a gaseous fuel source with an inlet 104 which is pressurized by a boost compressor 106 that delivers the gaseous fuel to an intercooler 108 that cools the gaseous fuel, to prevent auto-ignition and the like, by a coolant system, such as a water supply having an inlet 110 and an outlet 112. A pair of stop valves 114 and 116 are located downstream from the intercooler 108 with a vent valve 118 there between. This dual valve arrangement provides redundant fuel shut off as well as pressure relief via the vent valve 118. After the stop valve 116, the gaseous fuel line branches into separate lines dedicated to the gas injector(s) 120 of each combustion can (not shown) of the turbine engine. While the branch for one combustion can is detailed, the same components would be found in the other branches (represented by phantom arrows 121). It is typical for large power generation turbine systems to have several combustion cans, usually between six and eighteen in number. In each branch of the gaseous fuel line there is a metering valve 122 for metering gaseous fuel directly to the gas injector 120. The metering valve 122 can be mounted directly to the associated combustion can. One preferred construction of the metering valve 122 is disclosed in U.S. Pat. No. 6,250,602, which is assigned to the assignee of the present invention and hereby incorporated by reference as though fully set forth herein. This valve is a pintle valve with an axial thread drive that is highly accurate and provides precise metering and positive shut off of the gaseous fuel flow. As such, additional shut-off or other types of valves are unnecessary. This valve is preferably modified to allow for active cooling, again such as using a water system so as to reduce or prevent coking despite its proximity to the high heat environment. Furthermore, pressure 123 and/or temperature 125 transducers can be included to provide corresponding input signals to an electronic control (not shown), which can then compute various flow parameters, including volumetric and mass flow values, and relate flow to the position of the pintle.

Turning now to the liquid fuel side 102, this part of the fuel system has a liquid fuel tank 130 from which liquid fuel is withdrawn and pressurized by a forwarding pump 132. The liquid fuel is passed through a filter 134 on its way to a main pump 136, the inlet of which is pressurized by the forwarding pump 132. Excess pressure is relieved by relief valve 138 having a pressure transducer 137 for relaying pressure valves within the liquid fuel line to the electronic control. The relief valve 138 is controlled to direct excess capacity back to the main pump inlet (via a bypass line 139) when high pressure is sensed. A stop valve 140 provides shut-off control of the liquid fuel. After the stop valve 140, the liquid fuel line, like the gaseous fuel line, branches into separate lines dedicated to the individual combustion cans of the turbine, and again while the branch for one combustion can is detailed, the same components would be found in the other branches (represented by phantom arrows 141). Since it is common in power generating turbine systems to use primary injectors 142 and secondary injectors 144, for example using only the primary injectors for light-off during turbine start up, two metering valves are used for each combustion can, including a distributor (or combining) metering valve 146 and the metering purge valve 10. The metering purge valve 10 is configured as detailed above. The distributor metering valve 146 can be as disclosed in U.S. Pat. No. 6,931,831, and more preferably in the water cooled construction disclosed in the published application US 2005/0097880, both of which are noted above and incorporated by reference herein. Without going into detail, the distributor metering valve 146 provides fuel metering, with full shut-off capabilities, air purging, and distribution of the fuel to the multiple individual primary injectors 142, all in one unit. Like the gaseous fuel metering valve 122, the distributor metering valve 146 as well as the purging metering valve 10, can be mounted directly to the combustion can, without significant coking occurring in the valves because of the active cooling thereof. And like the gaseous fuel metering valve 122, volumetric and mass flow parameters can be determined sensing pressure and tempura and by measuring spool position electronically, and by relating the spool position to flow, and thereby mimicking that capability of prior flow dividers.

The distributor metering valve 146 and the metering purge valve 10 can use dedicated coolant and purge air systems, however, preferably they share common systems. In particular, the purge air source 148 is preferably comes from a compressor stage of the turbine, which provides a source of hot air, such as 400° Fahrenheit, which is then coupled to the associated valve's purge air inlets. The two liquid fuel valves being interconnected in series by line 150. Similarly, the active cooling can be down by a shared water system having inlet 152 and outlet 154 with the two valves being coupled in series via interconnecting line 156. Furthermore, the gaseous metering valve 122 can also share the common water system, and for example, can be connected in series to the metering purge valve 10 via interconnecting line 158. Finally, the two liquid fuel valves can share a common vent via interconnecting line 160 so as to both utilize a comment venting location 162.

The two liquid fuel valves work to either meter fuel to the associated injectors or to purge the injectors with hot air when not being fueled. The purge air works to prevent coking in the injectors, and also in the valves themselves, particular at the downstream side of the spool 12 in the metering purge valve 10, as well as lines and orifices downstream from the valve. It also serves to cool the injectors in the combustion can, since while the purge air is hot at about 400° F., it is significantly cooler than the temperatures realized during combustion, which near 2000° F. It is common for the purge air to be pressurized to about 300 psig and flow at about 0.05 lbs/sec. The liquid fuel stream is typically at a lower pressure and temperature of about 50 psig and 150° F., and circulating fuel through the valve 10 further works to reduce coking of the spool 12, particularly at its upstream side.

The aforementioned fuel control system advantageously eliminates the need for several components required by pre-existing systems. These components include flow dividers, shear valves, check valves and bypass metering valves, all of which add cost, size and additional failure points to the system. This consolidation of functionality gives rise to enhanced fuel flow control, in terms of metering precision and shut-off, provides for tighter control of the temperature spread across the turbine combustion areas, improves combustion stability and provides smoother gaseous-liquid fuel transfer.

It should be appreciated that merely one or more preferred embodiments of the invention have been described above. Many modifications and variations within the spirit and scope of the invention will be apparent to those skilled in the art. Therefore, the invention should not be limited to the described embodiment(s). To ascertain the full scope of the invention, the following claims should be referenced.

We claim:

1. A metering purge valve for use in a turbine fuel system, comprising:
    a valve body defining a valve passageway in communication with a purge air inlet, a fuel inlet and a fuel outlet; and
    a spool movable along a spool axis within the valve passageway, the spool having a metering surface for metering flow from the fuel inlet to the fuel outlet and an interchange providing communication through the spool from the fuel inlet to the metering surface of the spool;
    wherein the spool is movable from a first position in which the purge air inlet and the fuel inlet are essentially closed off from the fuel outlet, to a second position in which the fuel inlet is open to, and the purge air inlet is essentially closed off from, the fuel outlet to a third position in which the fuel inlet is essentially closed off from, and the purge air inlet is open to, the fuel outlet.

2. The valve of claim 1, wherein the interchange includes porting internal to the spool valve that opens to a region of decreased spool dimension proximate the metering surface.

3. The valve of claim 2, wherein a contoured surface defines the region of decreased spool dimension and is continuous to the metering surface.

4. The valve of claim 1, further including two seals sealing between the spool and the valve body, a first of the seals being located along the spool axis between the fuel inlet and the fuel outlet and a second of the seals being located along the spool axis between the purge air inlet and the fuel outlet.

5. The valve of claim 1, wherein the valve body further includes an interstitial vent in communication with the valve passageway and located along the spool axis between the fuel inlet and the fuel outlet.

6. The valve of claim 5, further including three seals sealing between the spool and the valve body, a first of the seals being located along the spool axis between the fuel inlet and the interstitial vent, a second of the seals being located along the spool axis between the purge air inlet and the fuel outlet, and a third of the seals being located along the spool axis between the interstitial vent and the fuel outlet.

7. The valve of claim 1, wherein the valve body includes porting and internal routing for fluid cooling the valve.

8. The valve of claim 1, further including a pressure compensating arrangement disposed between the fuel inlet and the valve passageway for holding the pressure at the meeting edge essentially constant, the pressure compensating arrangement including a movable inverted spool having an annular metering surface controlling flow through a stationary spool member having porting leading to the valve passageway.

9. The valve of claim 1, further including an onboard actuator for driving the spool along the spool axis.

10. A dual fuel turbine system having a fuel system including one or more combustion cans, each combustion can having one or more injectors, and a valve according to claim 1 alternatively metering fuel to the one or more injectors and passing hot purge air to the one or more injectors.

11. A flow control system for a fuel system of a dual fuel turbine engine, the fuel system having a first fuel supply and components for conveying the first fuel to the turbine and a second fuel supply and components for conveying the second fuel to the turbine, the turbine having a first injector for receiving the first fuel and a second injector for receiving the second fuel, the first and second injectors being in communication with a combustion area of the turbine, the flow control system comprising:
    a metering valve coupled to the second fuel supply for metering the second fuel directly to the second injector; and
    a metering purge valve coupled to a purge air line and to the first fuel supply for alternatively metering the first fuel directly to the first injector and purging the first injector, the metering purge valve including:
    a valve body defining a valve passageway in communication with a purge air inlet coupled to the purge air line, a fuel inlet coupled to the first fuel supply and a fuel outlet coupled to the first injector; and
    a spool movable along a spool axis within the valve passageway, the spool having a metering surface for metering flow from the fuel inlet to the fuel outlet and an interchange providing communication through the spool from the fuel inlet to the metering surface of the spool;
    wherein the spool is movable from a first position in which the purge air inlet and the fuel inlet are essentially closed off from the fuel outlet, to a second position in which the fuel inlet is open to, and the purge air inlet is essentially closed off from, the fuel outlet to a third position in which the fuel inlet is essentially closed off from, and the purge air inlet is open to, the fuel outlet;

wherein the metering valve meters the second fuel to the second injector only when and the metering purge valve is not purging or metering the first fuel to the first injector.

12. The system of claim 11, wherein the metering purge valve is actively cooled.

13. The system of claim 12, wherein the metering purge valve and the metering valve are both actively cooled using a shared coolant system.

14. The system of claim 11, wherein the turbine has multiple combustion zones each having first and second injectors.

15. The system of claim 14, wherein there are multiple metering purge valves each coupled to the first fuel supply for alternatively metering purge air and the first fuel to the first injector of each combustion zone and multiple metering valves each coupled to the second fuel supply for metering the second fuel to the second injector of each combustion zone.

16. The system of claim 14, further including a combining metering purge valve having an inlet coupled to the first fuel supply and having a valve member metering flow to a distributor section of the combining metering valve having multiple outlets through which one of purge air and the first fuel is passed to a set of multiple primary injectors of the first injectors.

17. The system of claim 16, wherein the metering purge valve, the metering valve and the combining metering valve are all actively cooled using a shared coolant system.

18. The valve of claim 11, wherein the valve body of the metering purge valve includes an interstitial vent in communication with the valve passageway and located along the spool axis between the fuel inlet and the fuel outlet.

19. The valve of claim 18, wherein the metering purge valve further includes three seals sealing between the spool and the valve body, a first of the seals being located along the spool axis between the fuel inlet and the interstitial vent, a second of the seals being located along the spool axis between the purge air inlet and the fuel outlet, and a third of the seals being located along the spool axis between the interstitial vent and the fuel outlet.

20. The valve of claim 11, wherein the metering purge valve further includes a pressure compensating arrangement disposed between the fuel inlet and the valve passageway for holding the pressure at the meeting edge essentially constant, the pressure compensating arrangement including a movable inverted spool having an annular metering surface controlling flow through a stationary spool member having porting leading to the valve passageway.

\* \* \* \* \*